Oct. 21, 1952  A. VAN DUYN ET AL  2,614,373
SLICING MACHINE WITH KNIFE-GRINDING MEANS
Filed Feb. 14, 1948  4 Sheets-Sheet 1

Inventors
Adrianus Van Duyn
Jetze Van Hoorn
By: Spencer, Marzall, Johnston & Cook, attys Oct. 21, 1952　　A. VAN DUYN ET AL　　2,614,373
SLICING MACHINE WITH KNIFE-GRINDING MEANS
Filed Feb. 14, 1948　　　　　　　　　　　　4 Sheets-Sheet 3

Inventors
Adrianus Van Duyn
Jetze Van Hoorn
By: Spencer, Margall, Johnston & Cook, attys

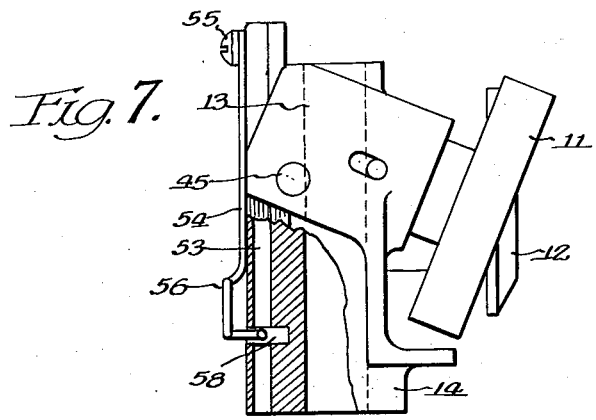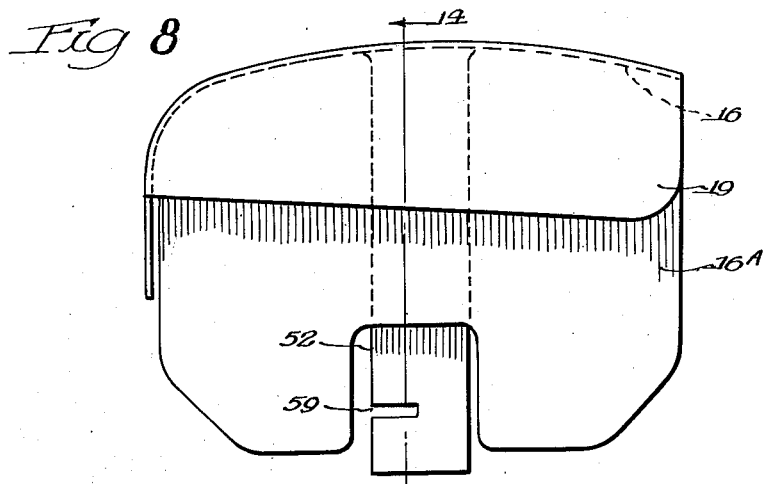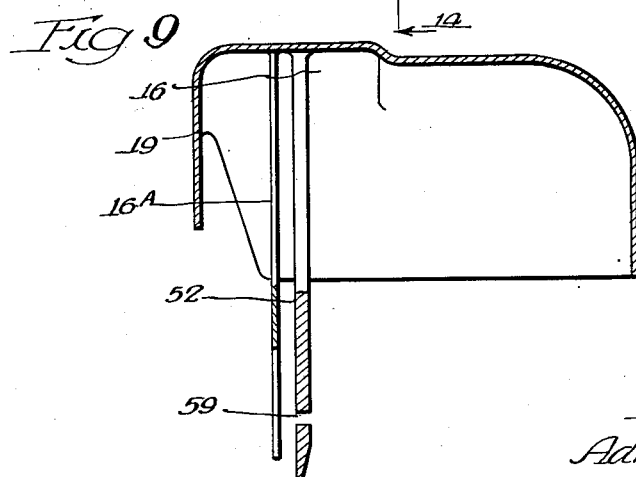

Patented Oct. 21, 1952

2,614,373

UNITED STATES PATENT OFFICE 2,614,373

SLICING MACHINE WITH KNIFE-GRINDING MEANS

Adrianus van Duyn, Hillegersberg, Rotterdam, and Jetze van Hoorn, Voorburg, Netherlands, assignors to U. S. Slicing Machine Company, Inc., La Porte, Ind., a corporation of Indiana Application February 14, 1948, Serial No. 8,354
In Great Britain October 4, 1946

3 Claims. (Cl. 51—248)

This invention relates to slicing machines of the type having a rotatable circular knife journalled in a bracket of the machine frame and provided with a knife-grinding apparatus which in use of the machine for slicing is out of operation but which can be moved, when the machine is not being used for slicing, into a position such that one or more grinding elements engage with the knife and sharpen the knife when it is rotated.

The present invention has for its object the provision of a slicing machine of the type stated whereof the knife-grinding apparatus is mounted inside a casing which is constituted with said apparatus as a unitary assembly mounted upon the knife bracket and which is formed as a cover that cooperates with the knife bracket to enclose the grinding apparatus in the inoperative position thereof, the mounting of the unitary assembly being such that the assembly can be guided from the inoperative position into the operative position. For instance, the guidance of the unitary assembly may be such that it can be lifted from the inoperative position, turned to bring the knife-grinding apparatus directly above the knife and lowered into the operative position.

Another object is the provision of formations of the said casing and of the knife bracket being such that their external surfaces come flush, or nearly flush, so that they more or less merge continuously into one another.

Another object is the provision of a slicing machine having its casing provided on top with a hand member whereby the unitary assembly (including the knife-grinding apparatus) is manipulated, and such a hand member may consist of a boss upstanding on the casing.

A further object is the provision of a slicing machine having its casing formed with recesses it its side walls so that in the operative position of the unitary assembly it straddles the knife; that is to say, the knife edge extends by way of said recesses into the interior of the casing and is engaged therein by the grinding apparatus. Provision is preferably made for closing such recesses in the inoperative position of the unitary assembly.

A still further object is the provision of a slicing machine wherein the mounting of the unitary assembly may be such that it can be removed from the knife bracket by a simple lifting action not involving the use of tools. The mounting may comprise a post on the knife bracket and a mating bore which extends through the body of the unitary assembly. The body and the knife bracket preferably have inter-engaging parts serving to lock the unitary assembly against turning round the said post in the operative and inoperative positions. The mounting of the unitary assembly preferably includes registering parts which determine the lowest operative position of the unitary assembly and which have an adjustment device to take into account reduction of the diametral size of the knife due to wear.

Still another object is the provision of a slicing machine wherein the mounting of the knife-grinding apparatus in the casing may be of such a nature that said apparatus can be detached and removed for inspection, cleaning or repair by simple manipulation not involving the use of tools. For instance, the body of said apparatus incorporates a slot-like socket fitted with a spring, and the casing has an internal limb which fits neatly into said socket and has a locking recess engageable by said spring automatically when the limb is pushed fully home in the socket, and the spring has an external formation which when displaced frees the spring from the recess and permits the apparatus to be slid from the casing.

Another object is the provision of a slicing machine wherein the casing may be formed with a member such that when the unitary assembly is in the inoperative position said member guards a section of the knife edge.

Numerous other objects and advantages will be apparent throughout the progress of the specification which follows.

The accompanying drawings illustrate a certain selected embodiment of the invention, and the views therein are as follows:

Fig. 7 is an elevation at right angles to Fig. 6, being partly in section on the line 12—12 of Fig. 6;

Fig. 8 is an elevation of the casing of the knife-grinding apparatus; and

Fig. 9 is an elevation at right angles to Fig. 8, being partly in section on the line 14—14 of Fig. 8.

Throughout the drawings, similar reference numerals are used to indicate similar parts.

Figure 1:
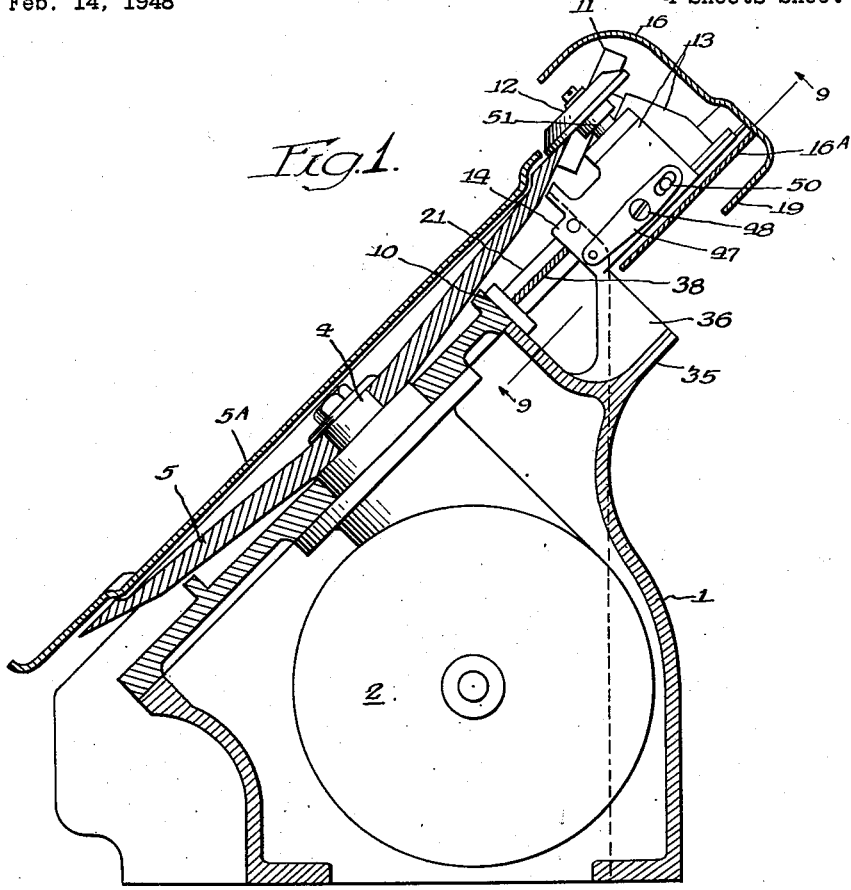
Fig. 1 is a sectional elevation of a construction of parts embodying the invention, said parts being shown as applied to a slicing machine of the so-called "gravity feed" class.
Figure 6:
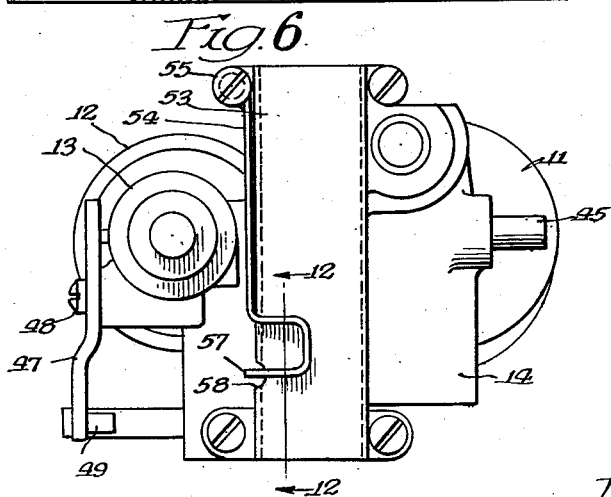
Fig. 6 is an elevation of the grinding apparatus as removed from the machine and detached from its casing.

Referring to the example according to Figs. 1 to 9, the machine being of the gravity feed class has its knife 5 set at an inclination, and the usual mask plate 5A is arranged in front of the knife to keep the substance to be sliced from pressing against the face of the knife (the edge of the knife being left exposed as usual at the slice-cutting zone). The electric motor 2 drives the knife axle 4 by any appropriate speed-reduction gearing, Fig. 1. In this example, the housing 1 which constitutes the knife bracket is formed with a cup-like recess for the accommodation of the knife-grinding apparatus in the inoperative position of the unit. The recess has for its bottom the flat top 10 of the housing, and the recess has a rear wall 35 and side walls 36 and 37, Figs. 1 and 2.

Figure 2:
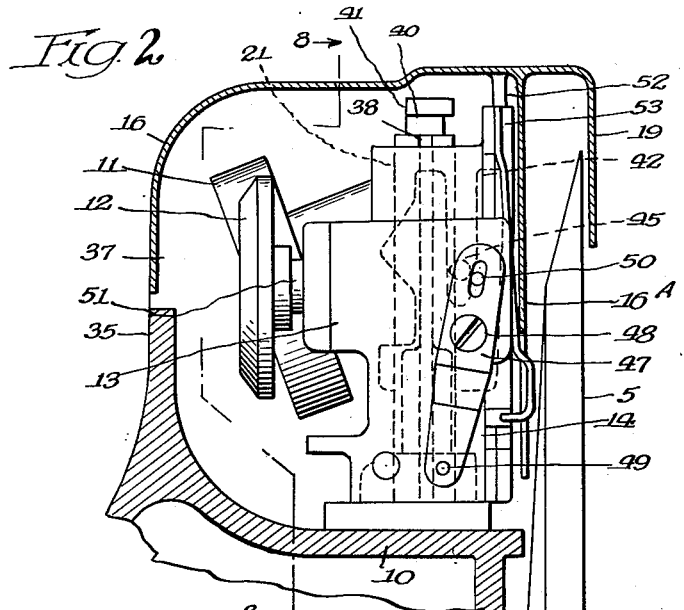
Fig. 2 is an enlarged fragmentary section showing certain parts in a direction opposite that shown in Fig 1, the knife-grinding apparatus being shown differently positioned.
Figure 3:
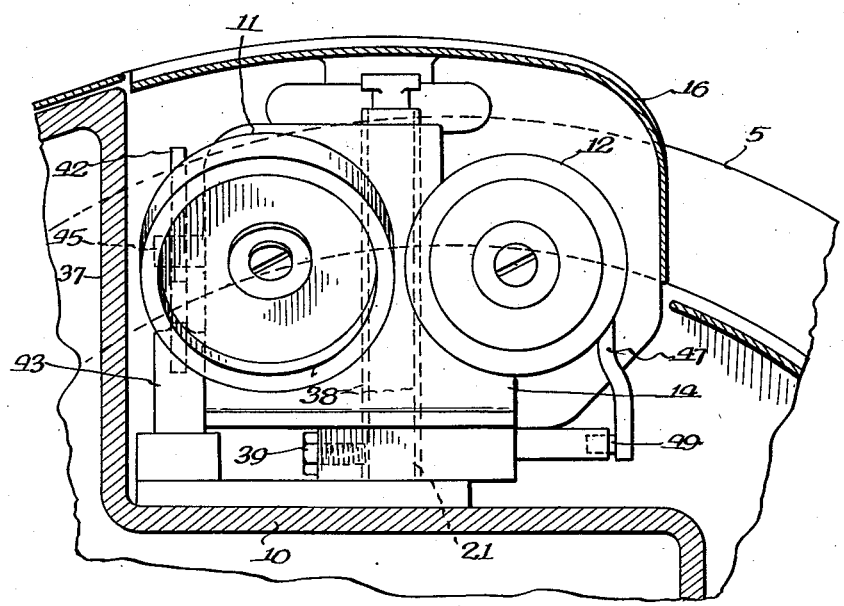
Fig. 3 is a sectional elevation of the parts shown in Fig. 2, the section being on the line 8—8 of Fig. 2.
Figure 4:
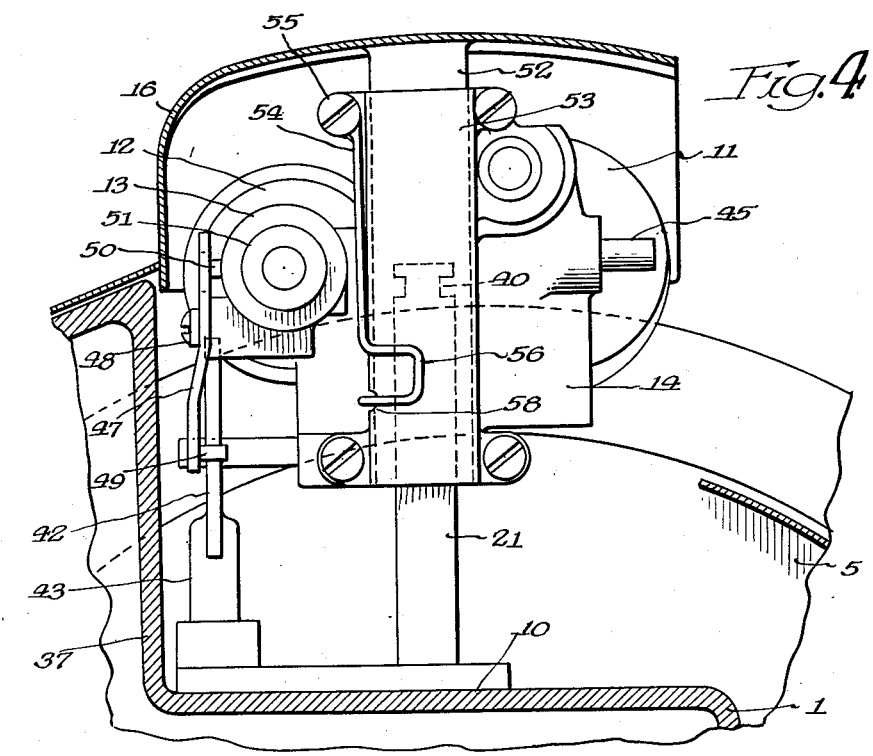
Fig. 4 is a section on the line 9—9 of Fig 1, being drawn to a larger scale than Fig. 1.
Figure 5:
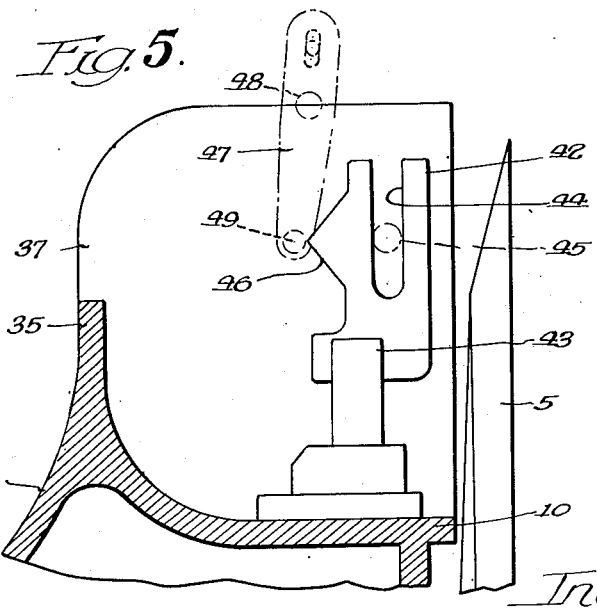
Fig. 5 is a view similar to Fig 2, except that the knife-grinding apparatus is removed.

As Figs. 2 and 3 show, the formation of the casing 16 and of the knife bracket housing are such that their external surfaces come flush so that they merge continuously into one another. The grinding wheel is shown at 11 and the overhanging down-turned member which serves as a knife guard is shown at 19 (Figs. 1 and 2).

In the example provision (as hereinafter described) is made for detaching the knife-grinding apparatus from its casing 16 by a simple manipulation not involving the use of tools.

The entire unit (that is the grinding apparatus and its casing) is removable by a simple lifting action, also not involving the use of tools. As shown in Figs. 1 to 3, the body 14 of the grinding apparatus is not only slidable on a post 21 which is parallel with the knife, but is constrained against turning in the operative and inoperative positions of the unit by diametrically opposed slots 38 in the post that are engageable alternatively by a screw 39 in the body. An annular recess 40 at the top of the slots 38 permits turning of the unit when it is lifted to bring the screw into register with the recess 40. A cut-away formation 41, Fig. 2, above the recess 40 permits the operator to lift the unit entirely from the post 21.

The pin-and-slot connection 38, 39 is assisted in its task of preventing inadvertent turning of the unit, when inoperatively positioned, by an upright member 42 that uprises from a base 43 on the flat top 10, Figs. 2 and 3. This member 42 is formed with a slot 44 that is engaged in the inoperative position of the unit by a pin 45 on one of the bearings 13, Fig. 2.

It will be seen that, in the movement of the unit from the inoperative position, Fig. 2, into the operative position, Fig. 1, the unit is guided firstly by the grooved post 21 and the member 42, next by the recess 40 as the unit is turned through 180°, and lastly by the grooved post 21 alone.

Provision is made for displacing the finishing wheel 12 temporarily clear of the knife so that said wheel cannot foul, and therefore damage, the knife edge when the unit is being moved to and from the operative position. The means provided include a cam 46 formed on the member 42, Figs. 2 and 5. A lever 47 that is fulcrumed at 48 on the bearing 13 of the wheel 12 (see also Figs. 1, 2 and 6) has a pin 49 at one end to cooperate with the cam 46. The lever 47, at its other end, has a slot connection with a pin 50 that extends from the usual internal bearing sleeve 51, Fig. 2, which is endwise slidable (against the action of a spring, not shown) but is not rotatable in the outer bearing 13. The axle of the wheel 12 is journalled as usual in the sleeve 51. The arrangement therefore is such that when the unit is turned appropriately on the post 21 for operation on the knife and is lowered towards the operative position, the cam 46 turns the lever 47 and causes it to push the sleeve 51 (against the spring action) into a position in which the wheel 12 passes the knife edge with adequate clearance. As the unit reaches the operative position, the cam 46 permits the wheel 12 to return (under the spring action) into a position in which it engages the knife edge. A corresponding procedure occurs when the unit is lifted from the inoperative position, the wheel again being temporarily displaced so as to pass the knife edge with adequate clearance.

The means whereby the casing 16 of the unit is detachable from the knife-grinding apparatus include a flat-section limb 52 which depends vertically and internally from the casing (see Figs. 8 and 9) and a deep slot-like socket 53 (see Figs. 6 and 7) of similar sectional form provided on the body 14 to receive the limb 52. The limb 52 is closely associated with the wall 16A. The limb fits neatly into the socket 53. The socket is fitted with a spring 54, the top end of which is anchored by a screw 55 (see Fig. 4). The spring has a bend 56 which terminates in a locking portion 57 that registers with an opening 58 in the side of the socket; and the opening itself registers with a locking recess 59 in the limb 52. Thus, when the limb is pushed fully home in the socket, the portion 57 of the spring automatically engages the recess 59; and so the casing 16 is locked to the body 14 of the knife-grinding apparatus. In order to free the casing 16 for detachment, the operator merely presses the bend 56 aside so as to retract the portion 57 from the recess 59.

In the example, the construction is shown applied to a gravity feed machine in Figs. 2 to 9. It will be understood however that any of the various constructions of the unit can be applied to any of the various slicing machines.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed is follows:

1. A slicing machine comprising a frame, a knife bracket extending from said frame, a slicing knife, knife-grinding apparatus for said knife, a casing in which said apparatus is mounted, said casing and apparatus constituting a unitary assembly, means for mounting said assembly upon said knife bracket for movement to operative and inoperative positions, said casing cooperating with the knife bracket to enclose the knife-grinding apparatus in an inoperative position, said mounting means for the unitary assembly including guide means for guiding the assembly from said inoperative position to an operative position, said mounting means being adapted to permit the assembly to be shifted manually away from the knife bracket without the use of tools, said mounting means being adapted to permit detachment and removal of said apparatus by a simple manipulation not involving the use of tools, a slot-like socket in said apparatus, a spring mounted on said apparatus, and an internal limb on said casing adapted to fit neatly into said socket and having a locking recess engageable by said spring automatically when the limb is pushed fully home in the socket.

2. A slicing machine comprising a frame, a knife bracket extending from said frame, a slicing knife, knife-grinding apparatus for said knife, a casing in which said apparatus is mounted, said casing and apparatus constituting a unitary assembly, means for mounting said assembly upon said knife bracket for movement to operative and inoperative positions, said casing cooperating with the knife bracket to enclose the knife-grinding apparatus in an inoperative position, said mounting means for the unitary assembly including guide means for guiding the assembly from said inoperative position to an operative position, said mounting means being adapted to permit said assembly to be shifted manually away from the knife bracket without the use of tools, said mounting means being adapted to permit detachment and removal of said apparatus by a simple manipulation not involving the use of tools, a slot-like socket in said apparatus, a spring mounted on said apparatus and an internal limb on said casing adapted to fit neatly into said socket and having a locking recess engageable by said spring automatically when the limb is pushed fully home in the socket, said spring having an external formation which when displaced frees the spring from the recess and permits the apparatus to be slid from the casing.

3. A slicing machine comprising a frame, a knife bracket extending from said frame, a slicing knife, knife-grinding apparatus for said knife, a casing in which said apparatus is mounted, said casing and apparatus constituting a unitary assembly, means for mounting said assembly upon said knife bracket for movement to operative and inoperative positions, said casing cooperating with the knife bracket to enclose the knife-grinding apparatus in an inoperative position, said mounting means for the unitary assembly including guide means for guiding the assembly from said inoperative position to an operative position, said mounting means being adapted to permit the assembly to be shifted manually away from the knife bracket without the use of tools, said mounting means being adapted to permit detachment and removal of said apparatus for inspection, cleaning or repair by a simple manipulation not involving the use of tools, a slot-like socket in said apparatus, a spring mounted on said apparatus and an internal limb on said casing adapted to fit neatly into said socket and having a locking recess engageable by said spring automatically when the limb is pushed fully home in the socket, and associated cam and lever means operative in response to movement of said apparatus to displace a grinding wheel from contact with said knife.

ADRIANUS van DUYN.
JETZE van HOORN.

REFERENCES CITED

The following references are of record in the file of this patent:

UNITED STATES PATENTS

| Number | Name | Date |
|---|---|---|
| 1,033,795 | Goodfellow | July 30, 1912 |
| 2,052,365 | Stukart | Aug. 25, 1936 |
| 2,052,366 | Ahrndt et al. | Aug. 25, 1936 |
| 2,119,760 | Weiner et al. | June 7, 1938 |
| 2,486,810 | Van Duyn | Nov. 1, 1949 |

FOREIGN PATENTS

| Number | Country | Date |
|---|---|---|
| 35,046 | Holland | Mar. 15, 1935 |
| 54,942 | Holland | July 15, 1943 |